Patented Oct. 5, 1954

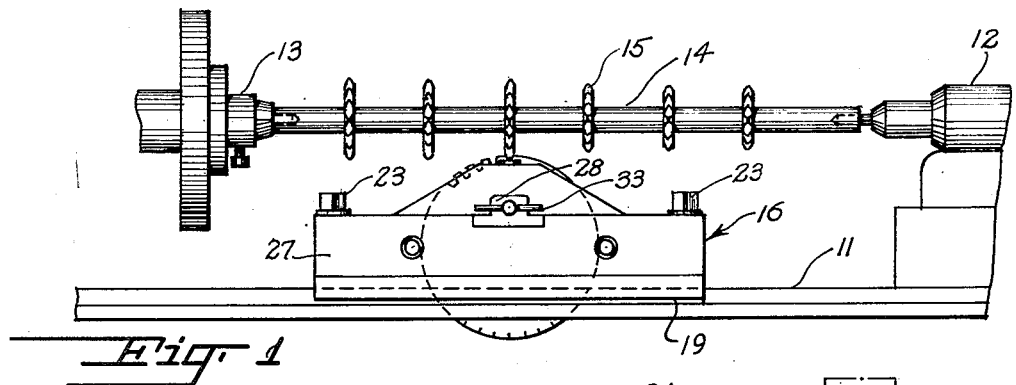
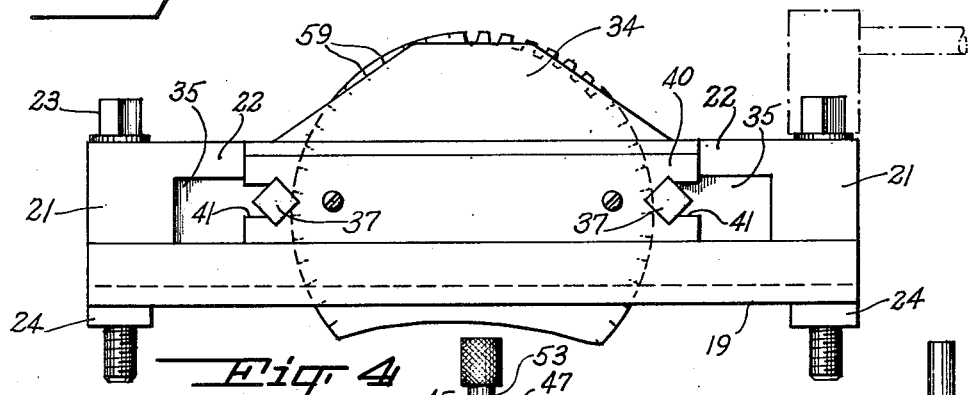
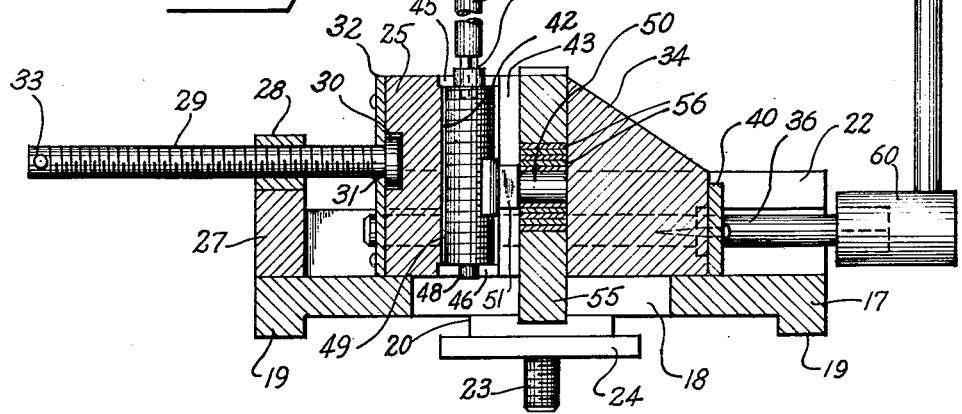

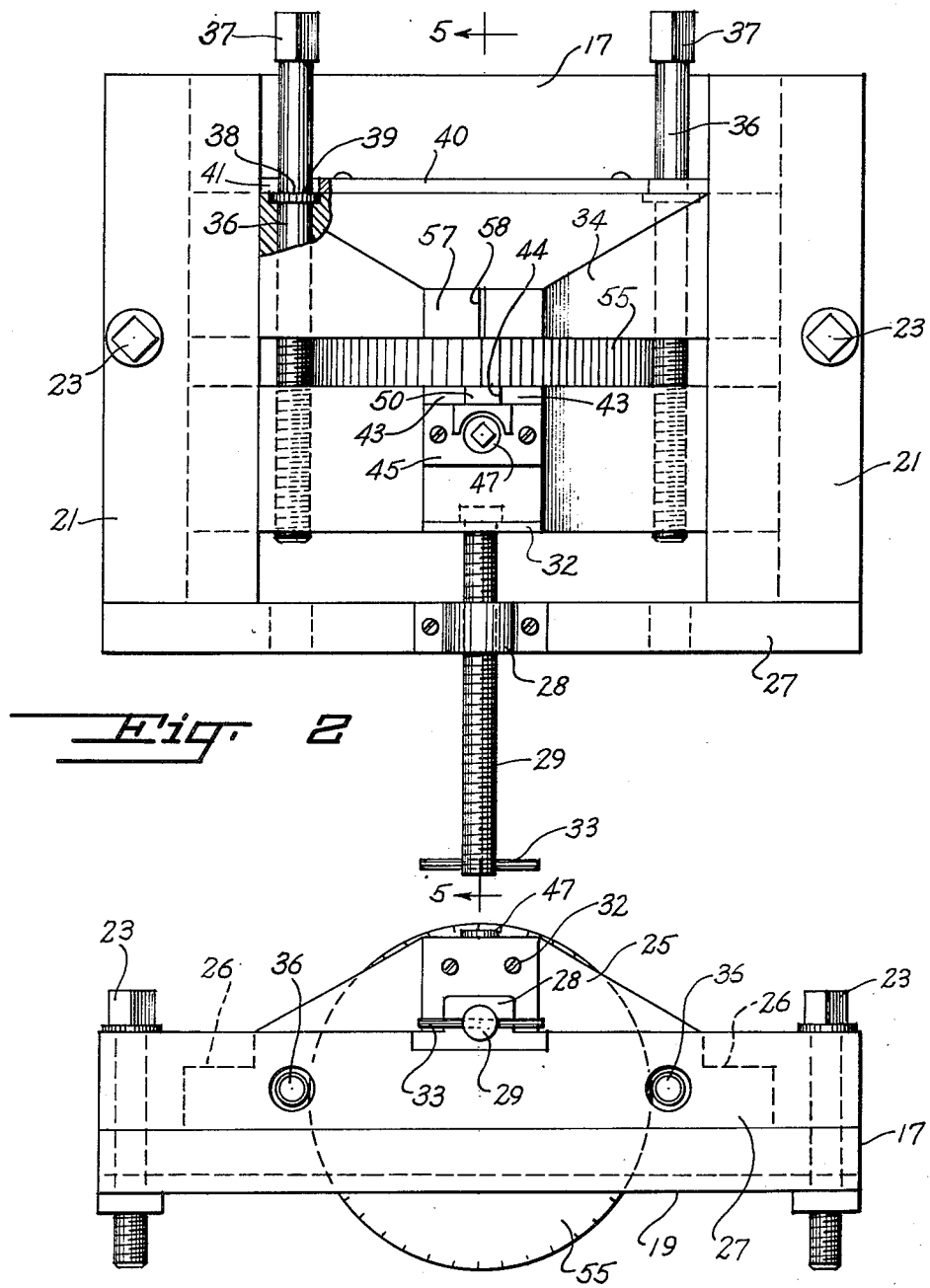

2,690,705

UNITED STATES PATENT OFFICE 2,690,705

GEAR CUTTING VISE

Stanley Cenerosky, Belle Vernon, Pa.

Application July 17, 1953, Serial No. 368,650

3 Claims. (Cl. 90—60)

This invention relates to lathe attachments, and more particularly to a gear cutting vise for use on a lathe.

The main object of the invention is to provide a novel and improved lathe attachment for cutting gears, said attachment being simple in construction, being easy to mount on a lathe, and securely supporting a gear blank in position for cutting the teeth thereof.

A further object of the invention is to provide an improved vise for supporting a gear blank on the bed of a lathe for cutting gear teeth on the blank, said vise involving inexpensive components, being durable in construction, and being easily adjustable in accordance with the size of the gear blank.

Further objects and advantages of the invention will become apparent from the following description and claims, and from the accompanying drawings, wherein:

Figure 1 is a fragmentary side elevational view of a lathe on which is mounted a gear cutting vise constructed in accordance with the present invention, with a gear blank secured in the vise and with the cutting tool mounted in the lathe for engagement with the periphery of the blank.

Figure 2 is an enlarged top plan view, partly in cross section, of the gear cutting vise shown in Figure 1.

Figure 3 is a front elevational view of the gear cutting vise illustrated in Figures 1 and 2.

Figure 4 is a rear elevational view of the gear cutting vise of Figures 1 to 3.

Figure 5 is cross sectional view taken on the line 5—5 of Figure 2.

Referring to the drawings, 11 designates the bed of a conventional lathe having the tail stock 12 and having a head stock not shown, to which is drivingly coupled, in a conventional manner, a chuck 13. Designated at 14 is the cutter spindle which is drivingly coupled to the chuck 13 and which is rotatably supported by the tail stock 12 in the manner illustrated in Figure 1. The cutter shaft 14 is provided with the gear tooth cutting elements 15 arranged in radial sets, spaced along the shaft 14, each set of cutters 15 corresponding to a different size or shape of gear tooth.

The gear blank vise is designated generally at 16 and comprises a base member 17 having the central rectangular aperture 18 and having the depending longitudinal rib elements 19, 19 adapted to engage over the longitudinal edges of the lathe bed 11. The base 17 is formed at its opposite ends, midway between the depending ribs 19, 19, with the depending rectangular lugs 20 adapted to be received in the usual longitudinal slot of the lathe bed 11.

Designated respectively at 21, 21 are bar members which are disposed transversely on the opposite ends of the base 17 and which are formed with the inwardly extending horizontal flanges 22. The bar members 21 are secured on the base member 17 by respective vertical bolts 23 which extend through the bar members 21 and the end portions of the base 17 and which are threadedly engaged with the respective rectangular locking plates 24, 24, said plates being rotatable to the position thereof shown in Figure 5, whereby the plates engage beneath the respective lathe bed tracks adjacent the respective ends of the depending lugs 20 to clamp the base 17, as well as the bar members 21, to the lathe bed. Therefore, it will be understood, that the locking plates 24 are rotated to positions extending parallel to the ribs 19 when the vise is to be mounted on the lathe, and that after the vise has been mounted on the lathe bed, the plates 24 are rotated 90° to the positions thereof illustrated in Figure 5, and are tightened in these positions by tightening the bolts 23, thus clamping the vise to the lathe bed.

Designated at 25 is a first jaw member which is slidably mounted on the base 17 and which is formed with ribs 26, 26 which are slidably received beneath the respective flanges 22, 22 of the bar members 21, 21. Secured to one side margin of the base member 17 is the vertical plate member 27, the plate member 27 being formed at its intermediate portion with an upstanding element 28 rigidly secured thereto. Threadedly engaged through the element 28 is the transverse feed screw 29, said feed screw 29 being formed with an enlarged cylindrical head 30 which is received in a recess 31 formed in the first jaw member 25. Designated at 32 is an apertured plate which is secured to the outer face of the jaw member 25 and through which the screw member 29 rotatably extends, as shown in Figure 5. The plate member 32 thus rotatably secures the end of the screw member 29 to the first jaw member 25, whereby rotation of the screw member 29 moves the jaw member 25 horizontally, as viewed in Figure 5, namely, either to the right or left. The screw member 29 is provided at its outer end with the transversely extending handle bar 33, for manually rotating said screw member.

Designated at 34 is a second jaw member which is formed at its side marginal portions with the respective ribs 35, 35 slidably received beneath the respective flanges 22, 22 of the bar members 21, 21, as shown in Figure 4. The second jaw member 34 is positioned on the base member 17 parallel to and opposing the first jaw member 25. Designated at 36, 36 are respective screw members which extend horizontally through respective cylindrical bores formed in the opposite end portions of the second jaw member 34 and which are threadedly engaged with the first jaw member 25, the screw members 36, 36 extending parallel to the screw member 29, as shown in Figure 2, but having headed portions 37, 37 projecting from the side of the vise opposite the screw member 29. The respective screw members 36, 36 are provided with the enlarged integral collar portions 38, 38 which are received in annular recesses 39 provided in the outer vertical faces of the second jaw member 34, a retaining plate 40 being secured to the outer face of said second jaw member, and being formed with the open ended slots 41 receiving the outer portions of the screw members 36 and cooperating with the enlarged collar portions 38 to rotatably secure the screw members 36 to the second jaw member 34. Thus, rotation of the screw members 36 develops horizontal thrust which moves the second jaw member 34 towards or away from the first jaw member 25, due to the threaded engagement of the screw members 36 with the first jaw member 25, as above described.

The first jaw member 25 is formed with a vertical guideway substantially of rectangular cross sectional shape, as shown at 42. Said first jaw member 25 is formed with the opposing flange elements 43, 43 projecting inwardly towards each other at the respective opposite margins of the groove 42 and defining a vertical slot 44 therebetween. Secured to the first jaw member 25 at the top and bottom ends of the groove 42 are the respective bearing plates 45 and 46 in which are journaled the respective reduced end portions 47 and 48 of a vertical screw member 49 positioned in the vertical groove 42. Designated at 50 is a horizontal stud element which is provided with a head portion 51 slidably fitting the space inwardly adjacent the flanges 43, 43 and the vertical groove 44, whereby the stud member 50 is movable vertically. The head member 51 is formed with internal threads which threadedly engage with the external threads on the screw member 49, whereby the rotation of the screw member 49 moves the stud member 50 vertically.

The upper bearing element 47 of the screw member 49 is formed with a non-circular recess which may be engaged by a suitable wrench 53 for rotating the screw member 49.

As shown in Figures 1 and 3, the inner opposing faces of the jaw members 25 and 34 are generally trapezoidal in shape and are adapted to receive a gear blank 55 therebetween. The gear blank 55 is of course provided with a circular central aperture which may be engaged on the stud member 50, suitable filler sleeves 56 being provided on the stud member 50, as illustrated in Figure 5. It will be understood that the filler sleeves 56 are employed where the central aperture of the gear blank is not equal in diameter to the diameter of the stud member 50, and since the central apertures of different gear blanks have different diameters, a suitable number of filler sleeves 56 will ordinarily be required to securely mount the gear blank on the stud member 50.

The top surface 57 of the second jaw member 34 is formed with a transverse index line 58 which serves as a means for properly positioning the gear blank for the cutting of the gear teeth thereon.

In using the device, the vise is mounted on the lathe bed in the manner above described, and as illustrated in Figure 1, the gear blank 55 being received between the jaw members 25 and 34 and being engaged on the stud member 50, as illustrated in Figure 5. The gear blank is adjusted in height to a position wherein the top portion thereof projects above the top surfaces of the jaw members 25 and 34 by a distance somewhat greater than the depth of the teeth to be cut, and the jaws 25 and 34 are clamping locked together by tightening the screw members 36, 36. The vise is of course positioned on the lathe bed in alignment with a selected series of gear tooth cutters 15, and before the beginning of the cut, the exposed portion of the periphery of the gear blank is located immediately adjacent the rotary path of movement of the selected cutters 15. To cut the groove between adjacent gear teeth, the screw member 29 is rotated, advancing the exposed peripheral portion of the blank past the cutters, the rotation of the screw member 29 causing the gear blank, held between the jaws 25 and 34 to be moved over the base 17 to the right, as viewed in Figure 5, and past the cutters 15. After the groove has been cut, the gear blank is retracted, the screw members 36, 36 are loosened and the gear is rotated through the interval between the index marks 59 on the periphery of the gear blank, to bring the next peripheral portion of the gear blank to be cut into alignment with the index line 58 on the top surface 57 of jaw member 34. It will be understood that the initial cut is made by positioning one of the index lines 59 on the gear blank periphery in registry with the index line 58.

After the gear blank has been rotated into position for the next cut, the jaw members 25 and 34 are tightened, by tightening the screw members 36, whereupon the blank may be fed past the cutters 15 by means of the feed screw 29 in the manner above described.

Suitable wrench members 60 are provided, said members having non-circular recesses adapted to interlock with the non-circular heads 37 on the screw members 36, whereby said screw members may be readily loosened and tightened. The wrench members 60 may also be employed for loosening and tightening the headed screws 23 employed for clamping the vise to the lathe bed.

While a specific embodiment of an improved gear blank supporting vise for use on the bed of a lathe has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A vise for supporting a gear blank on the bed of a lathe for cutting gear teeth on the blank comprising an apertured base member, means for clampingly securing said base member on the bed of a lathe, an upstanding element on said base member, a horizontal transverse screw threaded through said upstanding element, a first jaw member slidably mounted on said base member for transverse movement thereon, means swivelly connecting the end of said screw to said first jaw member, a second jaw member rotatably mounted on said base member, respective horizontal transverse additional screw members extending rotatably through the side marginal portions of said second jaw member and threadedly engaging the first jaw member, means rotatably connecting said additional screw members to said second jaw member, a vertical screw member journaled on said first jaw member and facing said second jaw member, a horizontal stud element engageable through the central aperture of a gear blank, and means on said stud element engaging the threads of said vertical screw member for adjusting said stud element vertically responsive to rotation of said vertical screw member.

2. A vise for supporting a gear blank on the bed of a lathe for cutting gear teeth on the blank comprising an apertured base member, means for clampingly securing said base member on the bed of a lathe, an upstanding element on said base member, a horizontal transverse screw threaded through said upstanding element, a first jaw member slidably mounted on said base member for transverse movement thereon, means swivelly connecting the end of said screw to said first jaw member, a second jaw member slidably mounted on said base member, respective horizontal transverse additional screw members extending rotatably through the side marginal portions of said second jaw member and threadedly engaging the first jaw member, means rotatably connecting said additional screw members to said second jaw member, the edge of said first jaw member adjacent the second jaw member being formed with a vertical groove, a vertical screw member journaled on said first jaw member and being disposed in said groove, a horizontal stud element engageable through the central aperture of a gear blank, and a head member on said stud element slidably disposed in said groove and having internal threads engaging the threads of said vertical screw member for adjusting said stud element vertically responsive to rotation of said vertical screw member.

3. A vise for supporting a gear blank on the bed of a lathe for cutting gear teeth on the blank comprising an apertured base member, means for clampingly securing said base member on the bed of a lathe, an upstanding element on said base member, a horizontal transverse screw threaded through said upstanding element, a first jaw member slidably mounted on said base member for transverse movement thereon, means swivelly connecting the end of said screw to said first jaw member, a second jaw member slidably mounted on said base member, respective horizontal transverse additional screw members extending rotatably through the side marginal portions of said second jaw member and threadedly engaging the first jaw member, means rotatably connecting said additional screw members to said second jaw member, the edge of said first jaw member adjacent the second jaw member being formed with a vertical groove, respective bearing plates secured to said first jaw member over the top ends and the bottom ends of said groove, a vertical screw member journaled at its respective ends in said bearing plates and being disposed in said groove, a horizontal stud element engageable through the central aperture of a gear blank, and a head member on said stud element slidably disposed in said groove and having internal threads engaging the threads of said vertical screw member for adjusting said stud element vertically responsive to rotation of said vertical screw member.

No references cited.